United States Patent
Corey et al.

(10) Patent No.: US 9,632,399 B2
(45) Date of Patent: *Apr. 25, 2017

(54) PORTABLE SUPPORT SYSTEM FOR PROJECTOR AND SCREEN

(71) Applicant: Spec Ops, Inc., Ashland, VA (US)

(72) Inventors: Robert W. Corey, Glen Allen, VA (US); William H. Anderson, Richmond, VA (US); Paul Joseph Indelicato, Locust Grove, VA (US)

(73) Assignee: Spec Ops, Inc., Ashland, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/823,105

(22) Filed: Aug. 11, 2015

(65) Prior Publication Data

US 2015/0346592 A1 Dec. 3, 2015

Related U.S. Application Data

(63) Continuation of application No. 13/792,004, filed on Mar. 9, 2013, now Pat. No. 9,140,963.

(51) Int. Cl.
| | |
|---|---|
| G03B 21/14 | (2006.01) |
| G03B 21/10 | (2006.01) |
| G03B 21/30 | (2006.01) |
| F16M 11/04 | (2006.01) |
| F16M 11/22 | (2006.01) |
| F16M 13/02 | (2006.01) |
| G03B 21/58 | (2014.01) |
| F16M 11/00 | (2006.01) |

(52) U.S. Cl.
CPC .............. *G03B 21/10* (2013.01); *F16M 11/04* (2013.01); *F16M 11/22* (2013.01); *F16M 13/022* (2013.01); *G03B 21/145* (2013.01); *G03B 21/30* (2013.01); *G03B 21/58* (2013.01); *F16M 11/00* (2013.01); *F16M 2200/08* (2013.01); *Y10T 29/49842* (2015.01)

(58) Field of Classification Search
CPC ...... F16M 11/04; F16M 11/22; F16M 13/022; F16M 11/00; F16M 2200/08; G03B 21/10; G03B 21/145; G03B 21/30; G03B 21/58; Y10T 29/49842
See application file for complete search history.

(56) References Cited

U.S. PATENT DOCUMENTS

| | | | |
|---|---|---|---|
| 4,148,453 | A | 4/1979 | Brantly |
| 4,705,355 | A | 11/1987 | Espo |
| 6,540,366 | B2 | 4/2003 | Keenan et al. |
| 6,637,711 | B2 | 10/2003 | Enochs |

(Continued)

*Primary Examiner* — Sultan Chowdhury
*Assistant Examiner* — Magda Cruz

(57) ABSTRACT

A portable projection and display system can include a frame assembly having one or more folding trusses, a counterweight bar arranged on a rearward bottom portion of the frame to help provide a stable base, and an adjustable boom. A projector can be mounted on one end of an adjustable boom. The boom can adjust a distance between the projector and the display screen. The boom can be mounted to the frame with a hinged connection to permit it to act as a lever to raise and lower the projector. An adjustable boom bar can be attached to an end of the boom opposite the projector such that adjustment of the boom bar raises and lowers the projector via a lever action about a fulcrum.

28 Claims, 13 Drawing Sheets

(56) References Cited

U.S. PATENT DOCUMENTS

| | | |
|---|---|---|
| 6,736,516 B1 | 5/2004 | Kepley et al. |
| 7,290,888 B2 | 11/2007 | Kepley, Jr. et al. |
| 7,537,184 B1 * | 5/2009 | Basilicato .............. G03B 21/54 |
| | | 248/123.11 |
| 7,631,848 B2 | 12/2009 | Enochs |
| 7,673,840 B2 | 3/2010 | Weber et al. |
| 7,673,995 B2 | 3/2010 | Harrison et al. |
| 8,267,527 B2 | 9/2012 | Kepley, Jr. |
| 8,328,367 B2 | 12/2012 | Nemeth et al. |
| 8,462,192 B2 | 6/2013 | O'Connell |
| 8,693,093 B2 | 4/2014 | Kepley, Jr. |
| 9,140,963 B2 * | 9/2015 | Corey ................... G03B 21/10 |
| 2005/0270497 A1 | 12/2005 | Kepley et al. |
| 2008/0030853 A1 | 2/2008 | Creel |
| 2009/0015798 A1 | 1/2009 | Unsworth |
| 2009/0057504 A1 | 3/2009 | Borissov |
| 2009/0173856 A1 | 7/2009 | Auger et al. |
| 2012/0056057 A1 | 3/2012 | Huang |
| 2012/0284647 A1 | 11/2012 | Fradkin et al. |
| 2013/0114048 A1 | 5/2013 | Konjhodzic et al. |
| 2014/0146508 A1 | 5/2014 | Charlton et al. |

* cited by examiner

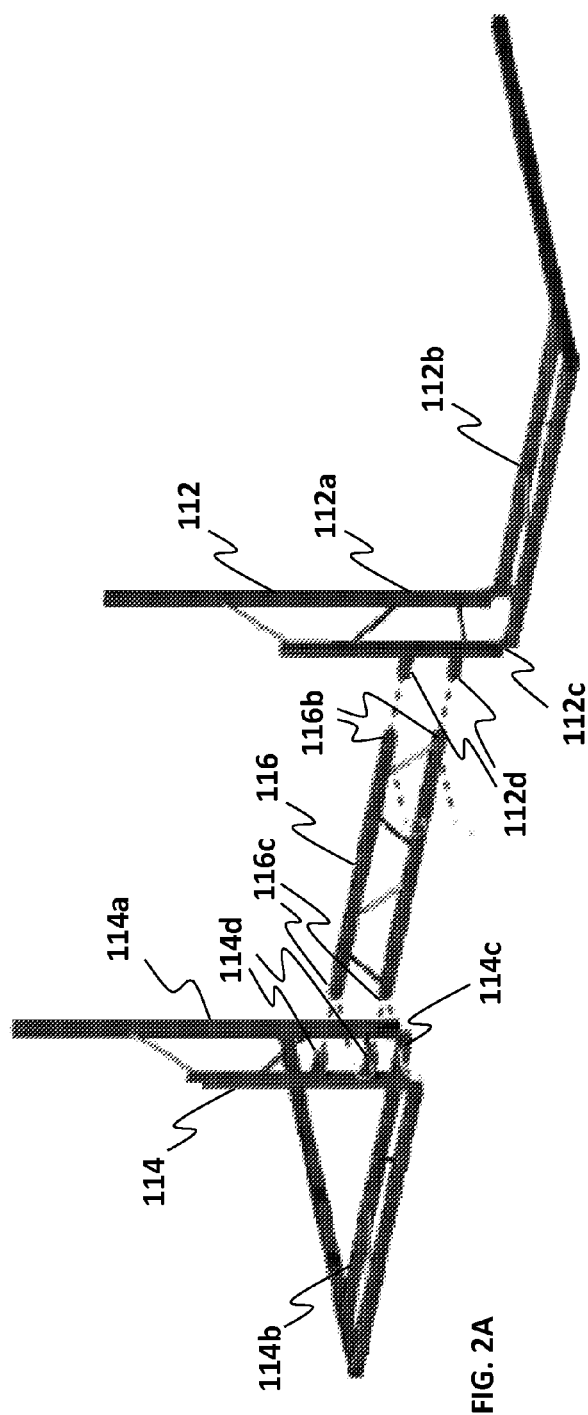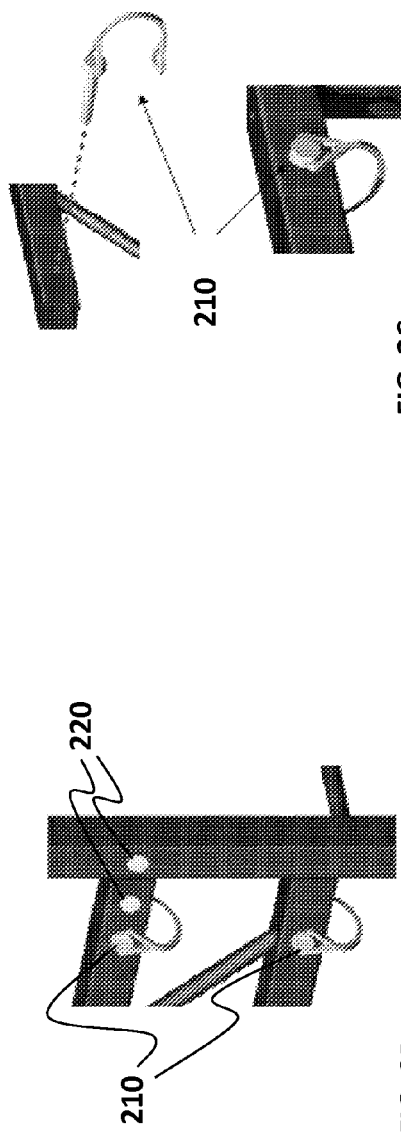
FIG. 2A
FIG. 2B
FIG. 2C

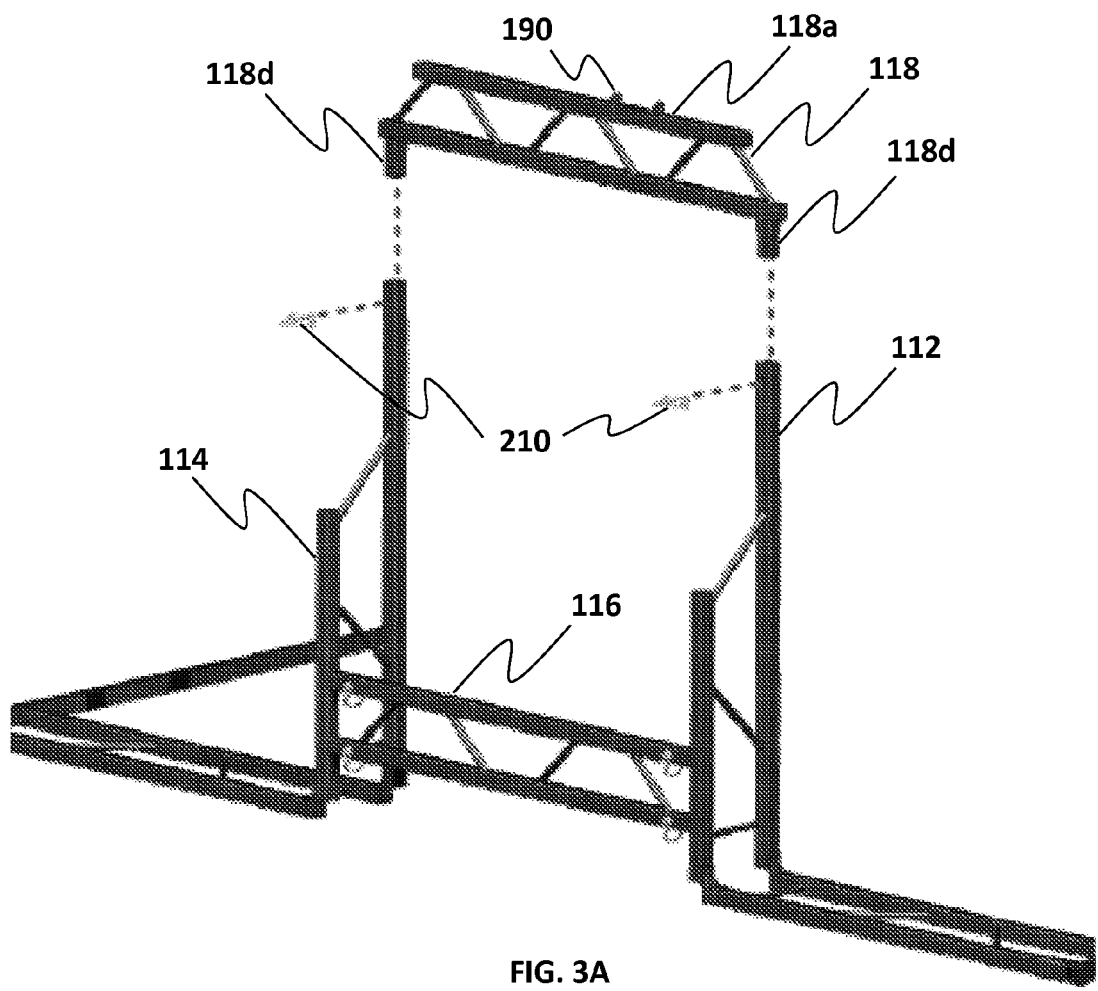
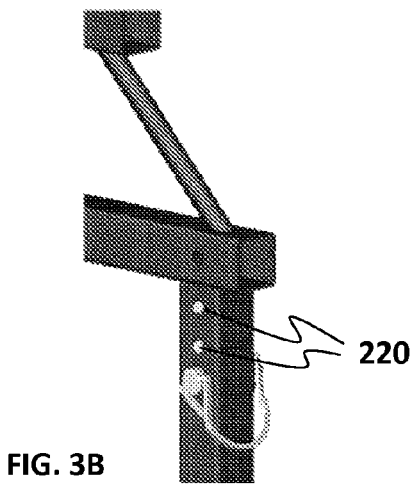
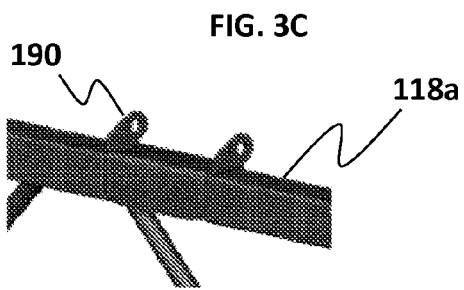
FIG. 3A
FIG. 3B
FIG. 3C

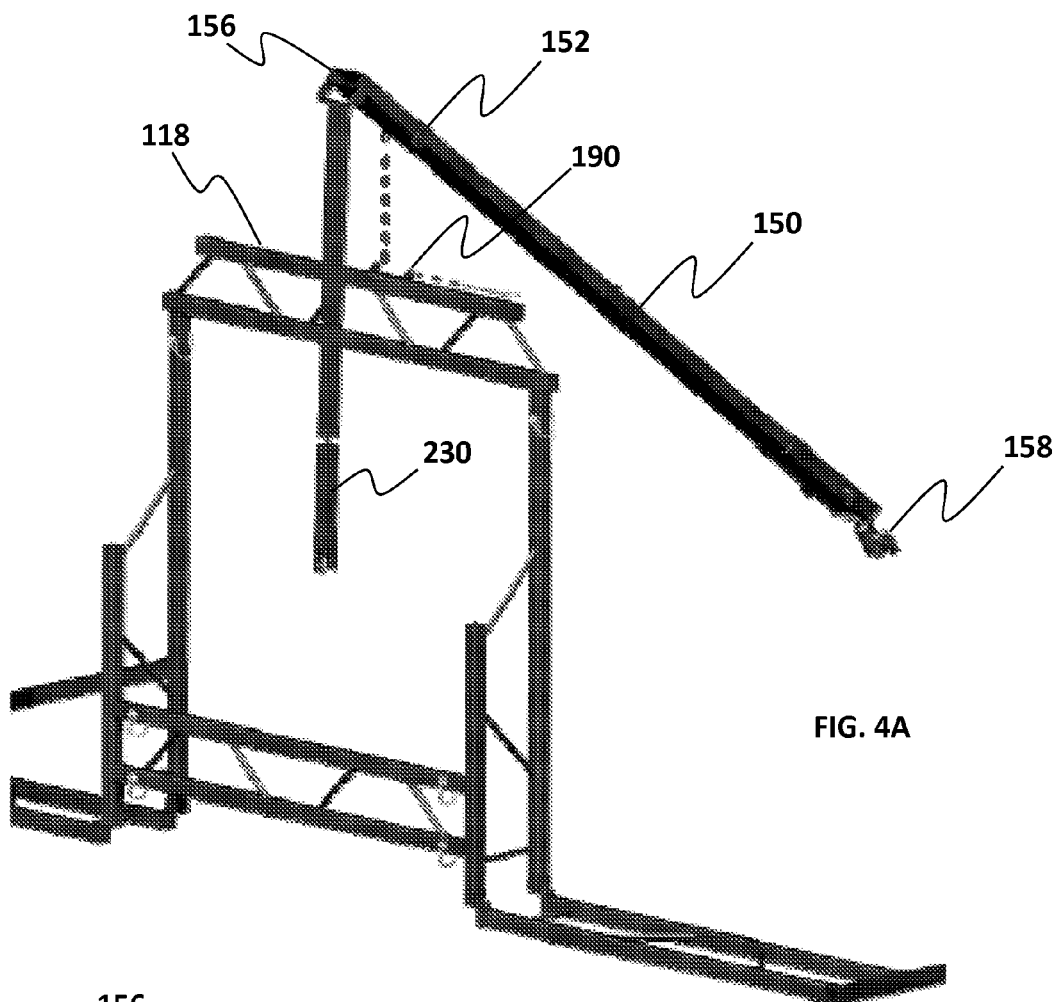
FIG. 4A
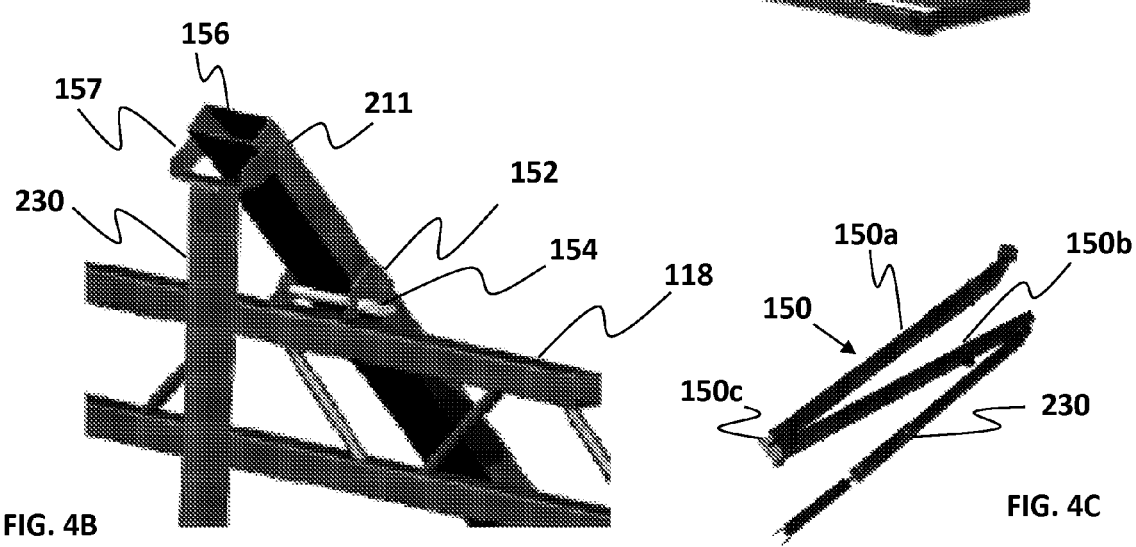
FIG. 4B
FIG. 4C

DISPLAY FRAME KIT (290)

PROJECTOR KIT (390)

PORTABLE SUPPORT SYSTEM FOR PROJECTOR AND SCREEN

RELATED APPLICATIONS

This patent application is a continuation of U.S. patent application Ser. No. 13/792,004, now U.S. Pat. No. 9,140,963, entitled "PORTABLE PROJECTOR AND SCREEN SUPPORT SYSTEM HAVING FOLDABLE FRAME ASSEMBLY," filed Mar. 9, 2013, the entire disclosure of which is hereby incorporated herein by reference.

TECHNICAL FIELD

This disclosure relates generally to projection and display systems. More particularly, this disclosure relates to a portable projection and display system that permits easy setup and take down of the display stand and further facilitates easy adjustment of the projection and display components.

SUMMARY OF THE DISCLOSURE

According to various embodiments and principles disclosed herein, a portable projection and display system can provide numerous improvements over the prior art. Other projection systems, such as those disclosed in U.S. Pat. Nos. 7,290,888 and 6,736,516, for example, may be more complex to set up, take down, store, and transport, may be harder to adjust, and may not be as sturdy or stable as is desirable.

According to one aspect of the present disclosure, a portable projection and display system can include support members comprising trusses. Left, right, middle and upper trusses can be used, for example, to provide strong support and stability to the display system. The trusses can be connected together to form a display frame. In one embodiment, the trusses can include mating tubes that mate one inside the other and can be secured together using latching hitch pins, which can be removably inserted through matching holes in the mated tubes. The tubes can have any desired cross-sectional shape (for example, circular, triangular, rectangular, or square), but in the embodiment shown, have a square cross-sectional shape.

Left and right side trusses can provide the vertical support members. Each vertical support member can have two or more sections joined together via a hinged attachment, to facilitate easy transportation and storage. Locking members can be provided to lock the vertical support members in their functional orientation, while permitting easy release and folding of the vertical support members for storage and transportation.

The display system can further be configured to facilitate any desired screen size or aspect ratio (e.g., 4:3 or 16:9). A foldable display screen of the desired size and shape can be unfolded and secured to a screen frame, such as through snap connectors. The screen frame can then be attached to the frame, for instance, using four thumb screws that fit through openings in the support members and secure into openings in the screen frame.

A counterweight bar, counterbalancing bar, or other counterweight or counterbalancing mechanism can be attached to the display system to offset the weight of a projector attached to the boom. The counterweight bar, for example, can attach to a rear bottom portion of the display system, such as to a rearward, bottom portion of the vertical support members. Support legs can also be attached to the bottom portion of the vertical support members and extend a desired distance in a forward direction from the support members to provide stability to the display system.

A projector can be attached to the display system via an adjustable boom. One end of the adjustable boom preferably includes a mechanism that attaches a projector to the boom. In one embodiment, this can be a ball mount for instance. A bracket having a ball mount can be securely connected to the projector. A ball receptacle can be arranged at the projector connection end of the adjustable boom. The ball mount can be arranged in the ball receptacle and a thumb screw can be tightened to secure the ball in the ball mount with the projector arranged in its desired orientation. The orientation of the projector with respect to the display system can then be easily manipulated by loosening the screw until the ball can be rotated within the ball mount. Once the desired orientation is achieved, the screw can be tightened to secure the projector in place. The vertical height of the projector and its distance from the display screen can preferably be manipulated using the adjustable boom assembly.

In one embodiment, the adjustable boom is hingedly attached to a boom bracket arranged along the top support member. The boom bracket provides a fulcrum for raising or lowering the projector. A boom adjuster, such as a boom adjustment bar can be used to connect a rearward end (opposite the projector connection end) of the boom to the middle support member (or other desired frame location). A removable hitch pin, for instance, can be arranged through mating holes to connect the bottom end of the boom adjustment bar to the middle support member. The boom adjustment bar can be hingedly connected to the rearward end of the boom to permit adjustment of an angle formed between the boom and the boom adjustment bar when adjusting a vertical position of a projector connection end of the boom. The boom adjuster preferably allows the projector to move vertically up and down to provide a way of mitigating keystoning of the projected image, which can result from the projector not being aligned substantially perpendicular to the screen.

In one configuration, the boom can have a tube-in-tube sliding design that permits adjustment of a position of the projector closer to or further away from the display screen. Of course, other adjustable configurations for the sliding boom could also be used, for example, such as C-channel, slotted plates, open sections, etc. The boom adjustment bar can comprise a multi-piece assembly (e.g., a three-piece assembly) having a rotatable middle section configured to shorten or lengthen the boom adjustment bar and thereby raise or lower the rearward end of the boom. Through the hinged lever arrangement, raising or lowering the rearward end of the boom lowers or raises the projector connection end of the boom. For instance, rotating the middle section about its vertical axis could be configured to shorten or lengthen the distance between the other two sections, and thereby shorten or lengthen the overall length of the boom adjustment bar and the vertical height of the projector connected to the opposite end of the boom. In one embodiment, one full rotation of the middle section could be configured to change the length of the boom adjustment bar by approximately 1/16 of an inch. Depending on the length and fulcrum point of the boom, this could translate, for instance, into raising or lowering the projector by approximately 1/2 inch. In addition to its ease of adjustment, this adjustment bar provides strength and durability to the adjustment mechanism, particularly as compared to cables used in other designs.

According to additional aspects incorporating the concepts disclosed herein, multiple display systems could be arranged and connected together side by side to provide increased viewing area. One or more joining clamps, for instance, could be used to connect screen frames of adjacently positioned display systems. Alternatively, one large screen could be used which extends across the multiple display frames, rather than separate screens for each system. This can facilitate better viewing of a single, larger continuous image across the multiple display systems. One or more projectors could be attached to the display systems to provide the viewable image(s) displayed on the display screen(s).

Various aspects, embodiments, and configurations of this invention are possible without departing from the principles disclosed herein. This invention is therefore not limited to any of the particular aspects, embodiments, or configurations described herein.

BRIEF DESCRIPTION OF FIGURES

The foregoing and additional features and advantages of example embodiments will become more readily apparent from the following detailed description of example embodiments, made with reference to the accompanying drawings, in which:

FIGS. 2A through 10 are somewhat schematic perspective views of various components of the portable projection and display system of FIG. 1, as more specifically introduced below.

FIGS. 2A through 2C illustrate foldable vertical support members and a connection between the vertical support members and a middle truss, generally as viewed from the rear.

FIGS. 3A through 3C illustrate a top truss and its connection to the vertical support members, generally as viewed from the rear.

FIGS. 4A and 4B illustrate connection of an adjustable boom to the top truss, generally as viewed from the rear, and FIG. 4C illustrates a foldable boom and boom adjustment bar assembly.

FIG. 6 illustrates attachment of a counterweight bar to the vertical support members, generally as viewed from the rear.

DETAILED DESCRIPTION OF ILLUSTRATIVE EMBODIMENTS

Various features, benefits, and configurations incorporating principles described herein for illustrative embodiments are shown in the accompanying drawings. Additional features, benefits and configurations will be readily apparent to those of ordinary skill in the art based on this disclosure and all such features, benefits and configurations are considered to be within the scope of the present invention.

Figure 1:
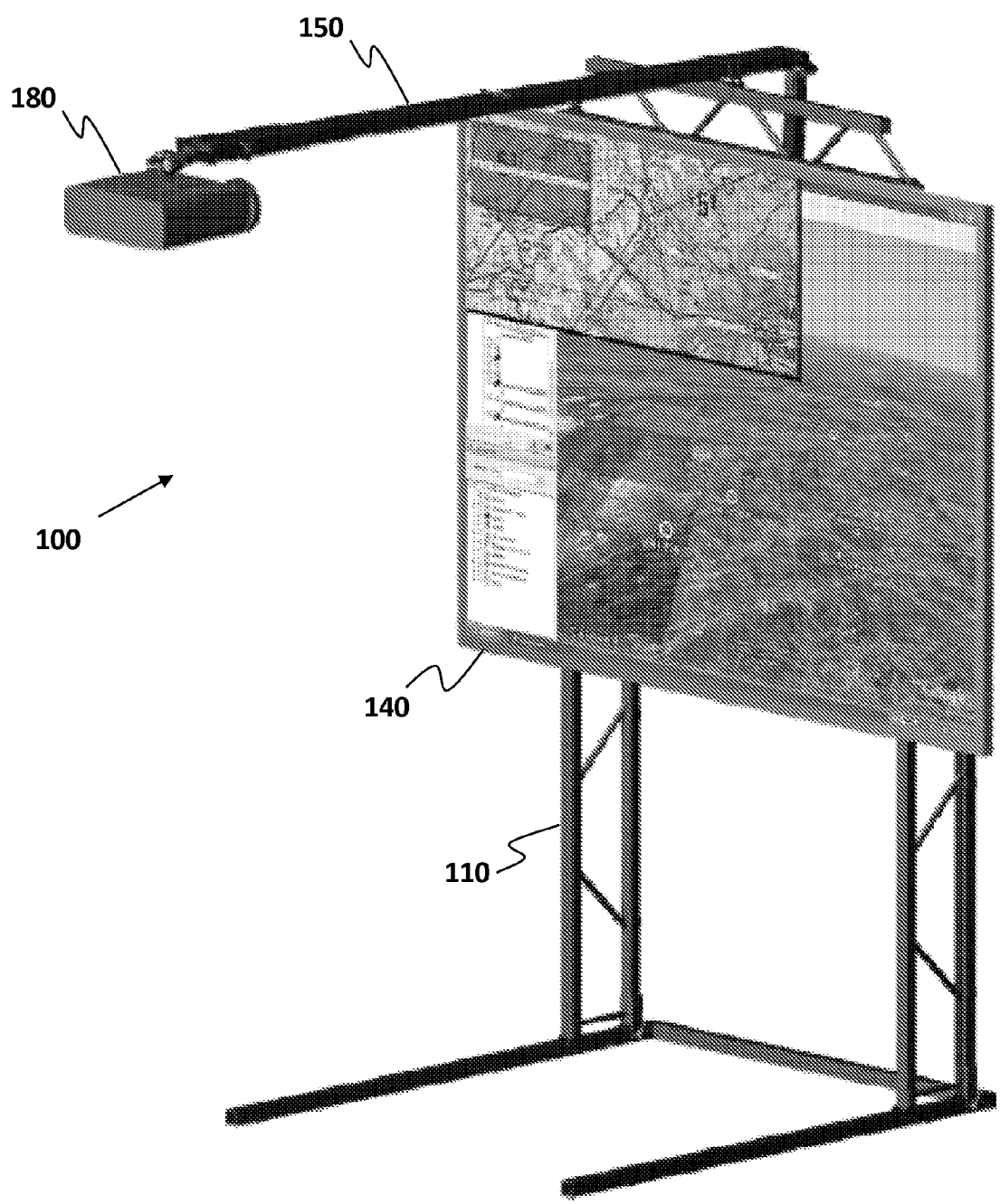
FIG. 1 is a somewhat schematic perspective view of a portable projection and display system according to one example embodiment, as viewed from the front.

Various illustrative embodiments will now be described in connection with the accompanying drawings. FIG. 1 is a somewhat schematic perspective view of a portable projection and display system 100 according to one example embodiment. Referring to FIG. 1, the portable projection and display system 100 can include a display frame 110 having a display screen 140 mounted thereon. A projector 180 can be attached to the display system 100 via an adjustable boom 150. The portable projection and display system 100 is preferably configured to permit easy setup and takedown of the display system 100, while further providing adaptability in terms of projector position and alignment as well as with respect to screen size and aspect ratio.

FIGS. 2A through 10 are somewhat schematic perspective views of various components of the portable projection and display system 100 of FIG. 1, further illustrating a process of setting up the portable projection and display system 100. Referring first to FIGS. 2A through 2C, the display system 100 according to this embodiment preferably comprises a plurality of support members. These support members can include, for instance, left and right trusses 112, 114 providing vertical support members, as well as a middle truss 116 and upper truss 118 (see FIG. 3A) providing horizontal support members.

As shown in FIG. 2A, the vertical support members 112, 114 each preferably comprise two or more sections 112a, 112b, 114a, 114b connected together via a hinged connection 112c, 114c. The hinged connections 112c, 114c also preferably include a locking mechanism (not shown) configured to lock the sections together in their functional orientation. The foldable vertical support members 112, 114 thereby facilitate easy transportation and storage by permitting them to be folded down to a more manageable size.

Further referring to FIG. 2A, the left and right trusses 112, 114 preferably include protrusions 112d, 114d configured to mate within receptacles arranged in ends 116b, 116c of the support bars 116a of the middle truss 116. Alternatively, of course, the horizontal bars 116a of the middle truss 116 could be configured to mate within receptacles of the protrusions 112d, 114d.

As further shown in FIGS. 2B through 2C, latching hitch pins 210 can further be provided to secure the trusses together in their mating relationship. The hitch pins 210, for instance, can be secured through matching holes in the bars 116a and protrusions 112d, 114d and then latched to prevent unintentional removal. Alignment marks 220 can also be included to ensure correct orientation of the components during assembly.

Referring now to FIG. 3A, the upper (top) truss 118 can also be connected to the vertical support members by mating protrusions 118d within receptacles in the vertical support members 112, 114 (or vice versa). Latching hitch pins 210 can be inserted through matching holes in the support members and then latched to prevent inadvertent removal. As shown in FIG. 3B, alignment indicators 220 can again be provided to ensure proper assembly.

FIG. 3C is a close-up illustration of a boom bracket 190 arranged along a top support bar 118a of the upper truss 118. The boom bracket 190 is preferably offset from a center horizontal position along the upper support bar 118a, and can be arranged further to the right or left when viewed from behind the display system 100.

FIGS. 4A and 4B illustrate connection of the adjustable boom 150 to the boom bracket 190 of the top truss 118. In one configuration, the boom 150 can have a tube-in-tube sliding design that permits adjustment of a position of a projector end 158 closer to or further away from the display screen 140 (see FIG. 1) by altering the length of the boom 150. A thumb screw or other device can be used to secure the length of the boom 150 at its desired length.

Referring to FIGS. 4A and 4B, the adjustable boom 150 preferably includes a separate bracket 152 or other connection mechanism (such as holes arranged through the boom itself) that permits a hinged connection with the boom bracket 190 on the top truss 118. As shown in FIGS. 4A and 4B, matching holes in the boom bracket 190 on the upper truss 118 and the bracket 152 on the boom 150 are aligned, and a quick release pin 154 is inserted through the matching holes to secure the boom 150 to the top truss in a hinged relationship. This hinge thereby acts as a fulcrum for movement of the adjustable boom 150.

A boom adjustment bar 230 is attached to a rearward end 156 of the adjustable boom 150, also preferably in a hinged relationship (e.g., via a bracket 157 secured to the rearward end by a pin, nut, or rivets 211). The boom adjustment bar 230 preferably enables adjustment of the height of a projector end 158 of the boom 150 via a lever action by adjusting the length of the boom adjustment bar 230. The construction and operation of the boom adjustment bar 230 will be explained in further detail with reference to FIGS. 7A and 7B.

Referring to FIG. 4C, the boom 150 can comprise a foldable, hinged structure to facilitate storage. As shown in FIG. 4C, a hinge 150c can be arranged mid-length along boom 150 to connect two sections 150a, 150b of the boom together in a foldable relationship. Of course more than two sections and more than one hinge could be used to provide additional foldability and permit the boom 150 to be compacted into a shorter length. The one or more hinges could be arranged at any desired position along the boom 150, and one or more locking mechanisms (not shown) could be provided to lock the boom 150 in its extended position and prevent folding until disengaged.

Figure 5A:
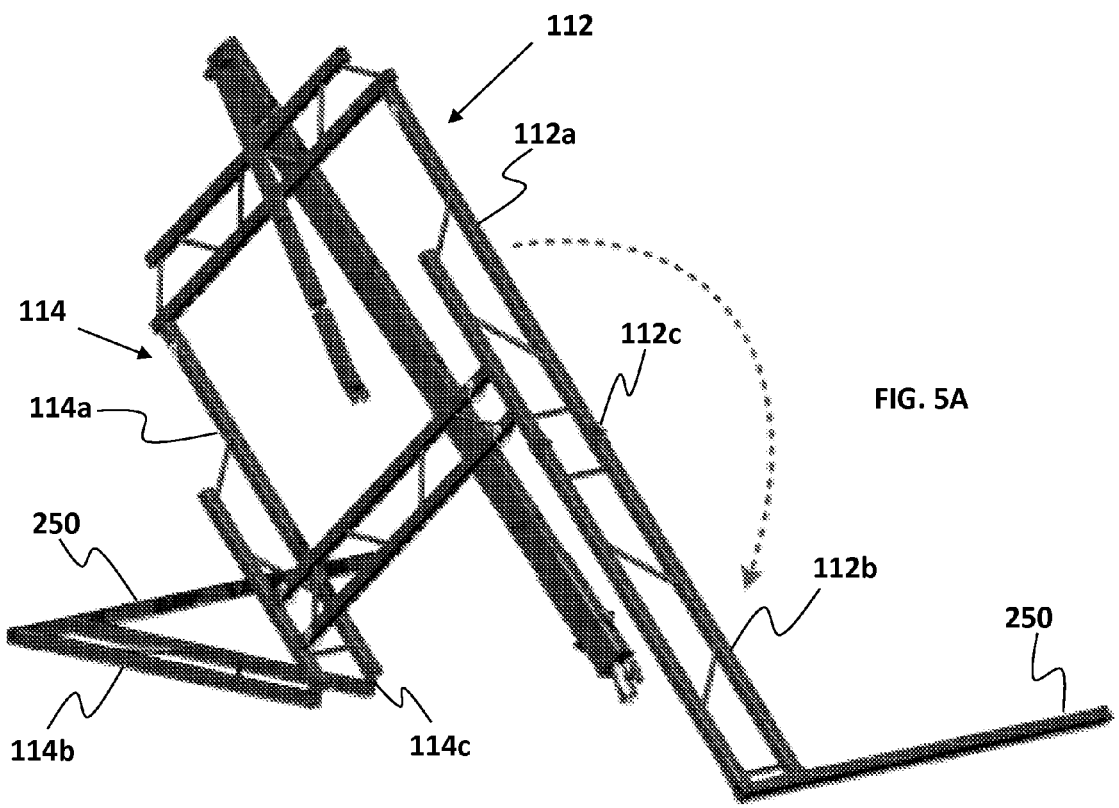
FIGS. 5A and 5B illustrate straightening and locking sections of the vertical support members in place, generally as viewed from the rear.
Figure 5B:
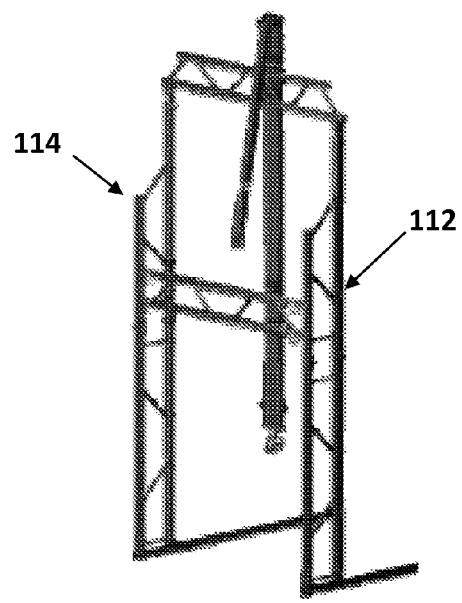

FIGS. 5A and 5B illustrate a process of straightening and locking the sections 112a, 112b, 114a, 114b of the vertical support members 112, 114 in place. Referring to FIGS. 5A and 5B, the foldable sections 112a, 112b of one of the vertical support members 112 are preferably straightened (by rotating the sections 112a, 112b about their hinged connection 112c) until they lock into place. The other vertical support member 114 can then be straightened and locked into place in a similar manner.

The locking members (not shown) on the vertical support members 112, 114 preferably maintain the sections 112a, 112b, 114a, 114b of the vertical support members 112, 114 in their proper functional relationship until disassembly. The locking members can be selectively disengaged to permit folding of the vertical support members 112, 114 for transportation and storage.

Figure 6:
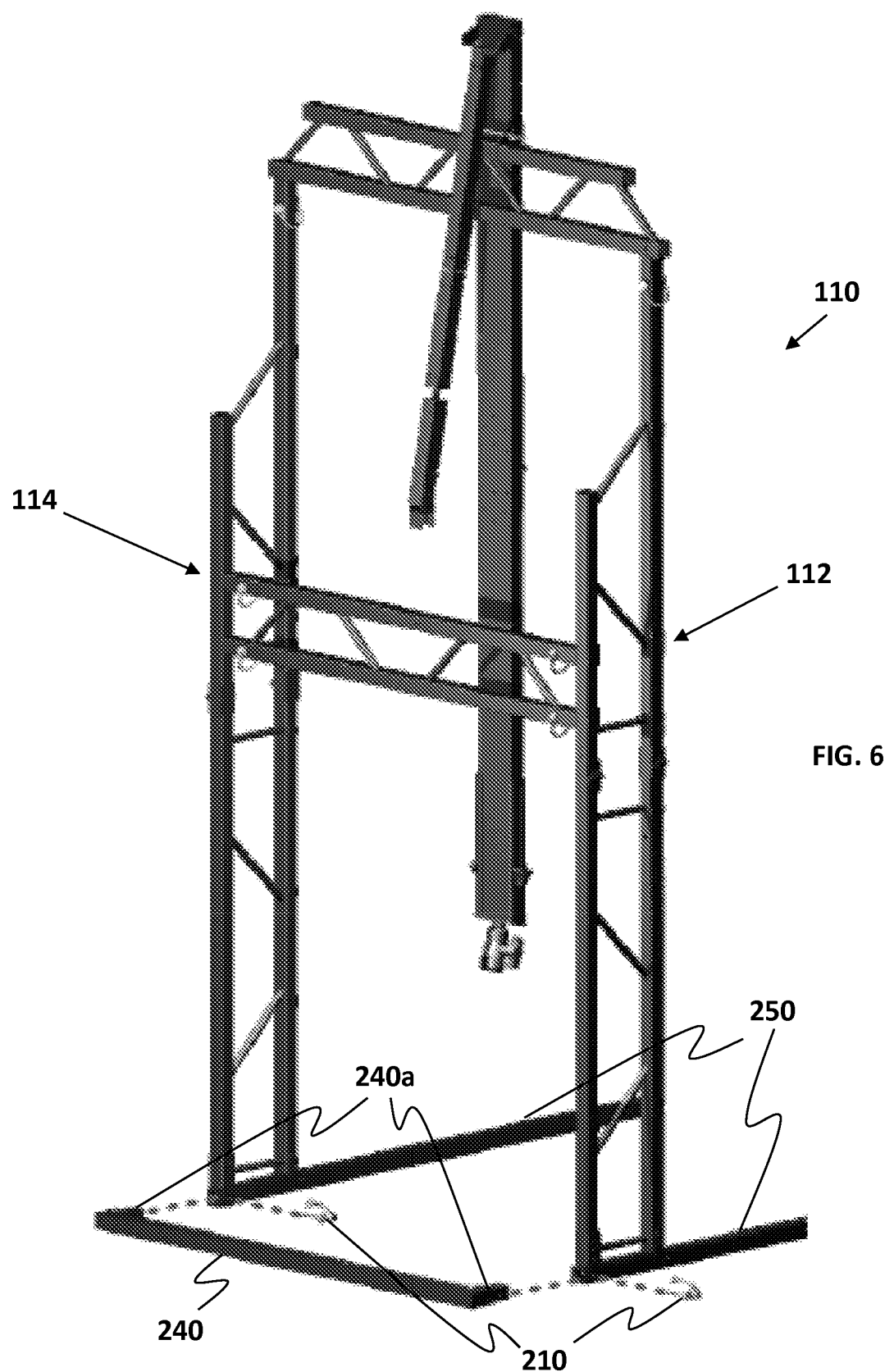

FIG. 6 illustrates attachment of a counterweight bar 240 to the vertical support members 112, 114. Referring to FIG. 6, the counterweight bar 240 can be a weighted bar having a sufficient weight to help maintain a stable base for the display frame 110. The counterweight bar 240 can include protrusions 240a that mate within receptacles at the bottom of the vertical support members 112, 114. In the embodiment shown, the receptacles are openings arranged in the rearward end of base bars 250 attached to the bottom of each of the vertical support members 112, 114. The base bars 250 preferably extend a predetermined distance from the forward side of the vertical support members 112, 114 to provide a stable base for the display system 100. Hitch pins 210 can again be used to secure the counterweight bar 240 to the base bars 250.

Figure 7A:
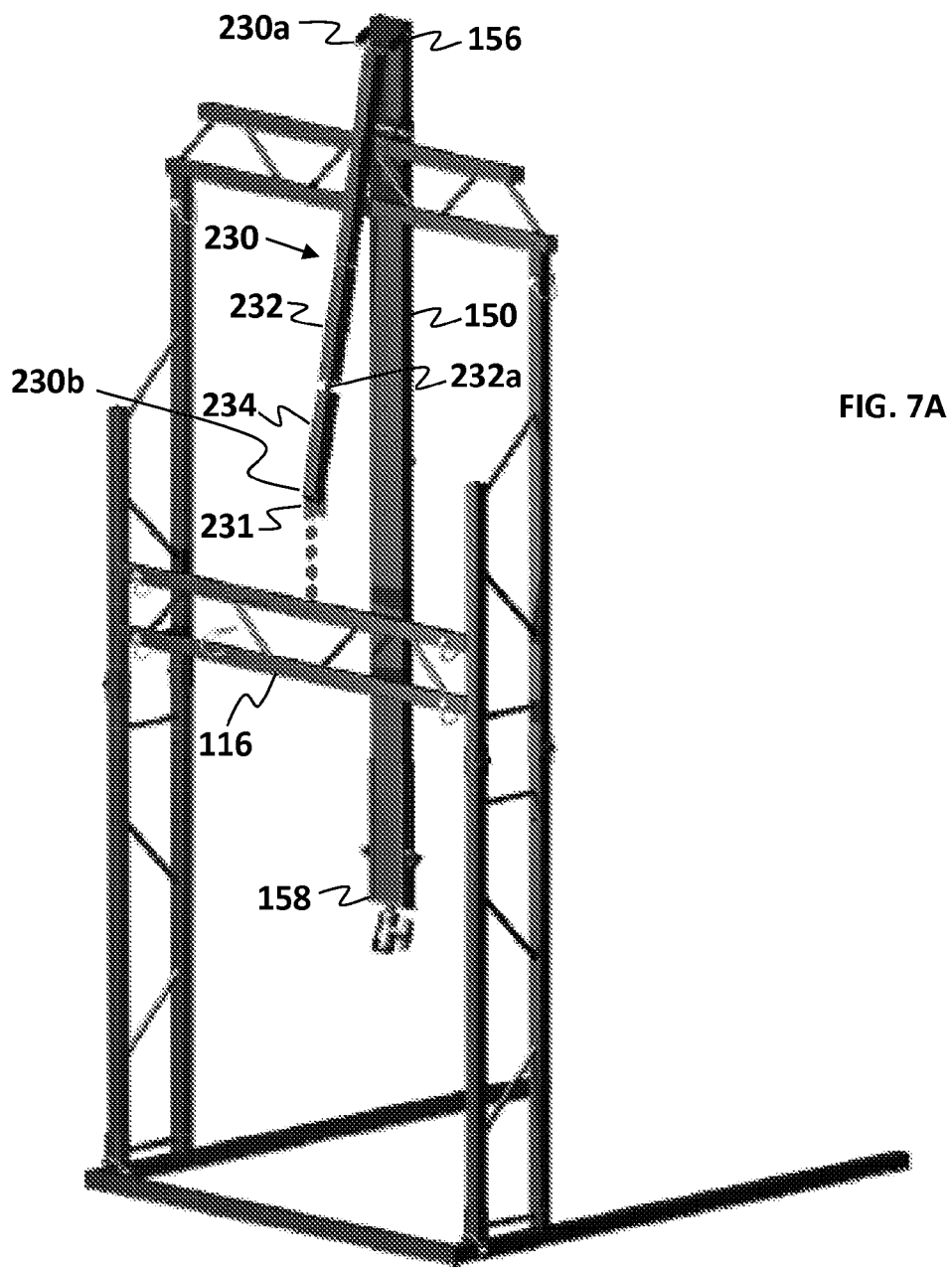
FIGS. 7A and 7B illustrate attachment of the boom adjustment bar to the middle truss, generally as viewed from the rear.
Figure 7B:
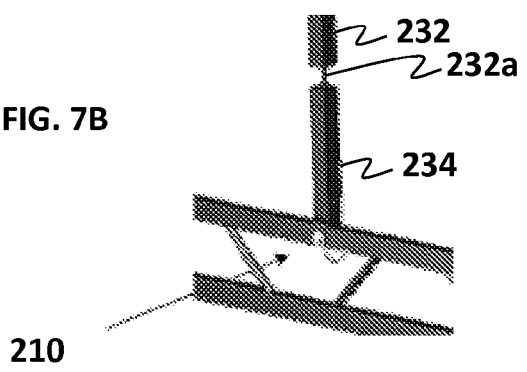

FIGS. 7A and 7B illustrate attachment of the boom adjustment bar 230 to the middle truss 116. Referring to FIGS. 7A and 7B, a bracket 231 can be arranged on an end 230b of the boom adjustment bar 230 opposite its end 230a that is connected to the adjustable boom 150. The bracket 231 preferably includes holes that can be aligned with matching holes through the middle truss 116. A hitch pin 210 can then be inserted through the matching holes to secure the boom adjustment bar 230 to the middle truss 116.

The boom adjustment bar 230 can comprise a multi-piece assembly (e.g., a three-piece assembly) having a rotatable middle section 232 configured to enable the shortening or lengthening of the boom adjustment bar 230 to thereby raise or lower the rearward end 156 of the boom 150. Through the hinged lever arrangement, raising or lowering the rearward end 156 of the boom lowers or raises the projector connection end 158 of the boom 150. For instance, rotating the middle section 232 about its vertical axis could be configured to shorten or lengthen the distance between the other two sections, and thereby shorten or lengthen the overall length of the boom adjustment bar 230 and the vertical height of the projector connected to the opposite end 158 of the boom 150.

In one embodiment, the middle section 232 could include a threaded connection 232a with one or more of the other sections 234. One full rotation of the middle section 232 could be configured to change the length of the boom adjustment bar 230 by approximately $\frac{1}{16}$ of an inch. Depending on the length and fulcrum point of the boom 150, this could translate, for instance, into raising or lowering the projector end 158 (and attached projector) by approximately $\frac{1}{2}$ inch. In addition to its ease of adjustment, this adjustment bar 230 provides strength and durability to the adjustment mechanism, particularly as compared to cables used in other designs.

Figure 8A:
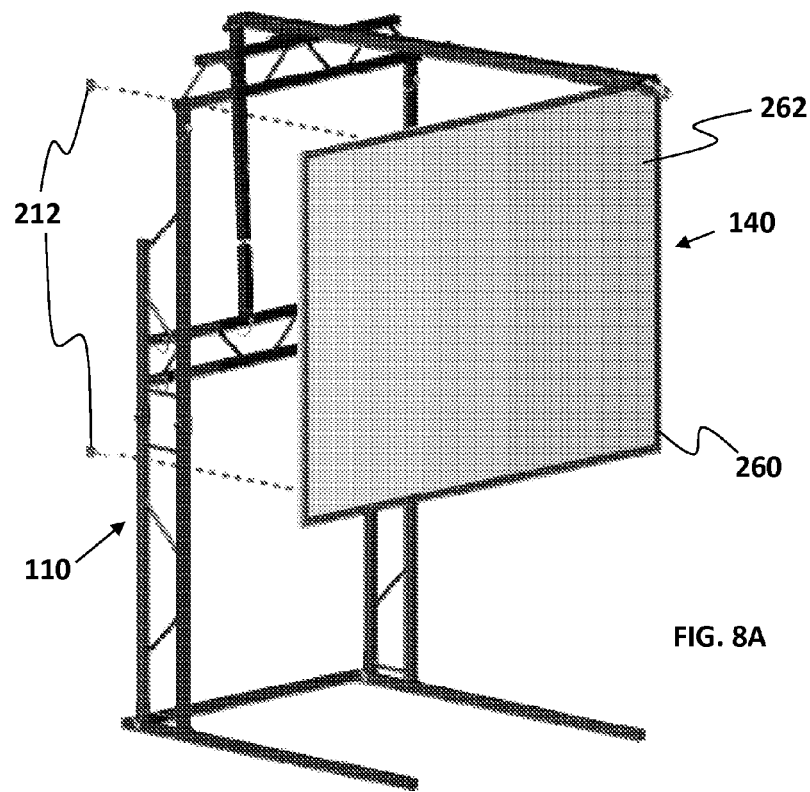
FIGS. 8A and 8B illustrate attachment of a display screen frame to the display system, generally as viewed from the front and rear, respectively.
Figure 8B:
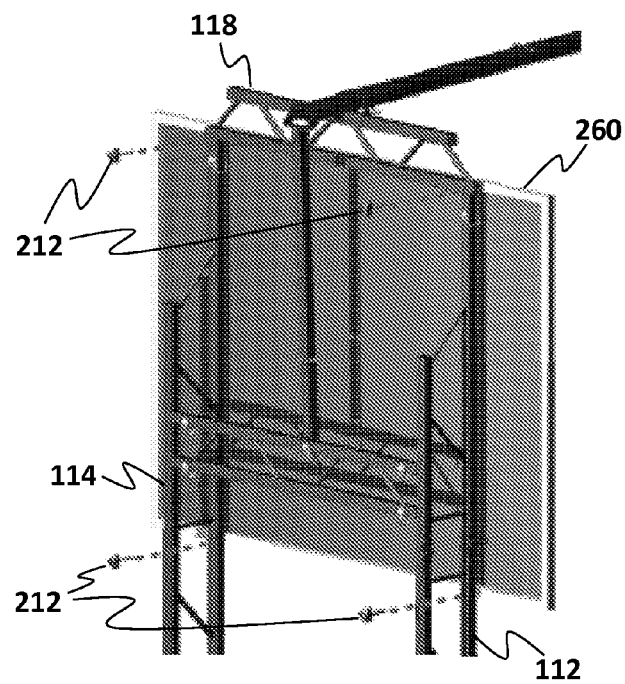

FIGS. 8A and 8B illustrate attachment of a display screen 140 to the display system 100. Referring now to FIGS. 8A and 8B, the display screen 140 can comprise a display screen material 262 and a display screen frame 260. The display screen material 262 can be unfolded or unrolled and attached to a display screen frame 260. Snap connections (not shown) could be provided, for instance, to connect the screen material 262 to the screen frame 260. The display screen 140 can be any desired size and/or shape and can be configured to match a desired aspect ratio (e.g., 4:3 or 16:9). The screen frame 260 can be attached to the display frame 110 using any desired attachment mechanism. The attachment mechanism preferably provides a secure attachment that is readily removable.

In the embodiment shown, for instance, thumb screws 212 can be provided to secure the display screen frame 260 to the upper truss 118 and the vertical support members 112, 114.

In this case, four thumb screws 212 are provided, with two thumb screws being used to secure a top of the screen frame 260 to the upper truss 118, and one being used to secure a bottom of the screen frame 260 to each of the vertical support members 112, 114. Of course, more or fewer thumb screws 212 could be used, and other attachment mechanisms could be used entirely.

For instance, the screen frame 260 could be latched onto one or more of the support members 112, 114, 116, 118 using removable clamps (not shown). Or the display screen frame 260 could simply be hung from the upper truss 118 using a clasp, bracket, or flange (also not shown). It is desirable, however, that the screen frame 260 be attached in a manner that permits it to be readily removed from the display system 100 for transportation and storage.

Figures 9A, 9B:
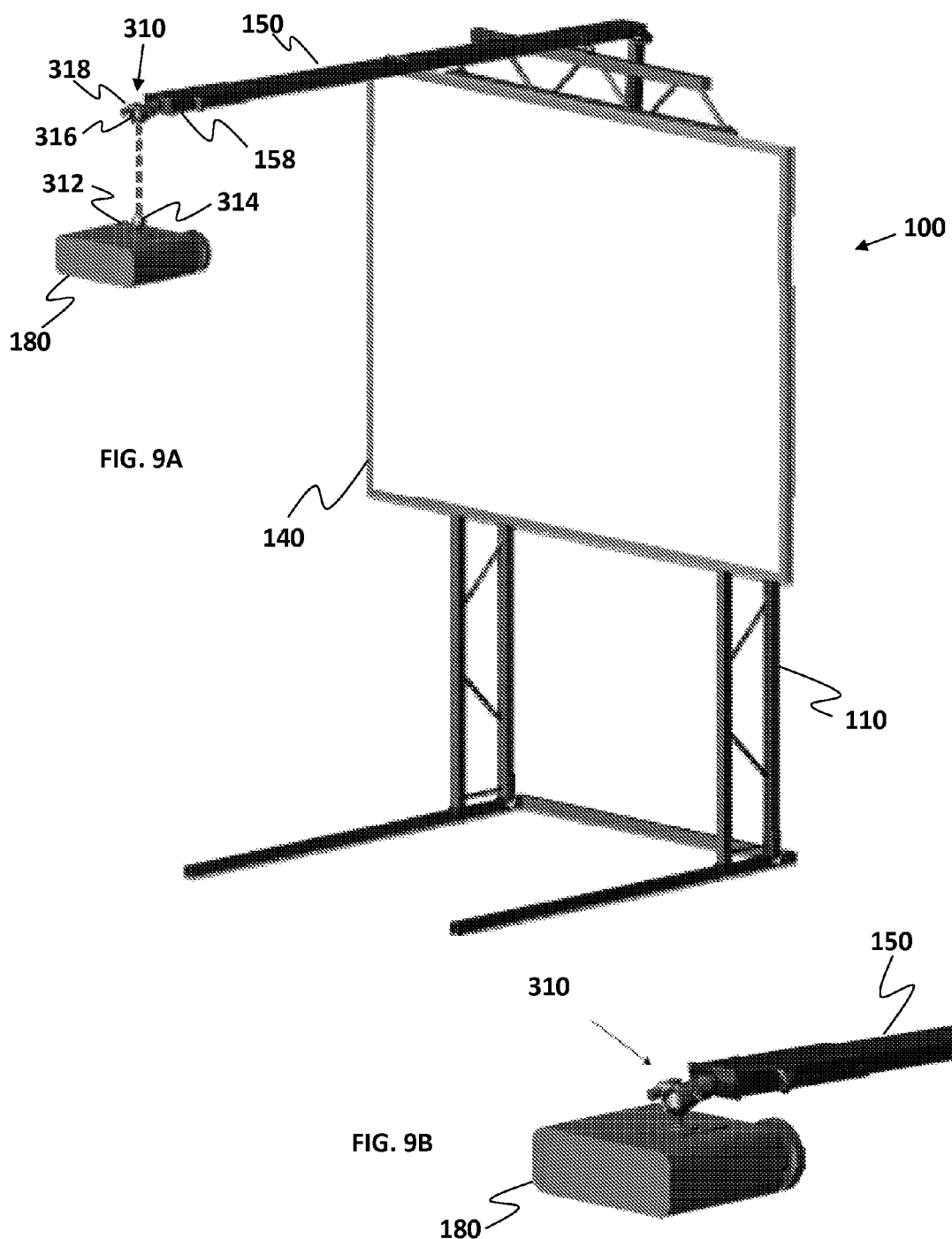
FIGS. 9A and 9B illustrate connection of a projector to the adjustable boom, generally as viewed from the front.

FIGS. 9A and 9B illustrate connection of a projector 180 to the adjustable boom 150. Referring to FIGS. 9A and 9b, a projector 180 can be attached to the display system 100 on one end 158 of the adjustable boom 150. More specifically, a projector connection end 158 of the adjustable boom 150 preferably includes a mechanism 310 configured to attach the projector 180 to the boom 150.

In the embodiment shown, this connection mechanism 310 is a ball mount assembly. More particularly, a bracket 312 having a ball mount 314 can be securely connected to the projector 180. A ball receptacle 316 and securing mechanism 318 can be affixed to the projector connection end 158 of the adjustable boom 150. To attach the projector 180 to the boom 150, the ball mount 314 can be arranged in the ball receptacle 316 and a thumb screw (or other securing mechanism) 318 can be tightened to secure the ball 314 in the ball receptacle 316 with the projector 180 arranged in its desired orientation. The orientation of the projector 180 with respect to the display frame 110 (and hence the display screen 140) can then be easily manipulated by loosening the screw 318 until the ball 314 can be rotated within the ball receptacle 316.

Once the desired orientation is achieved, the screw 318 can be tightened to secure the projector 180 in place. The vertical height of the projector 180 and its distance from the display screen 140 can also preferably be manipulated using the adjustable boom 150 and boom bar 230 assembly.

Figure 10A:
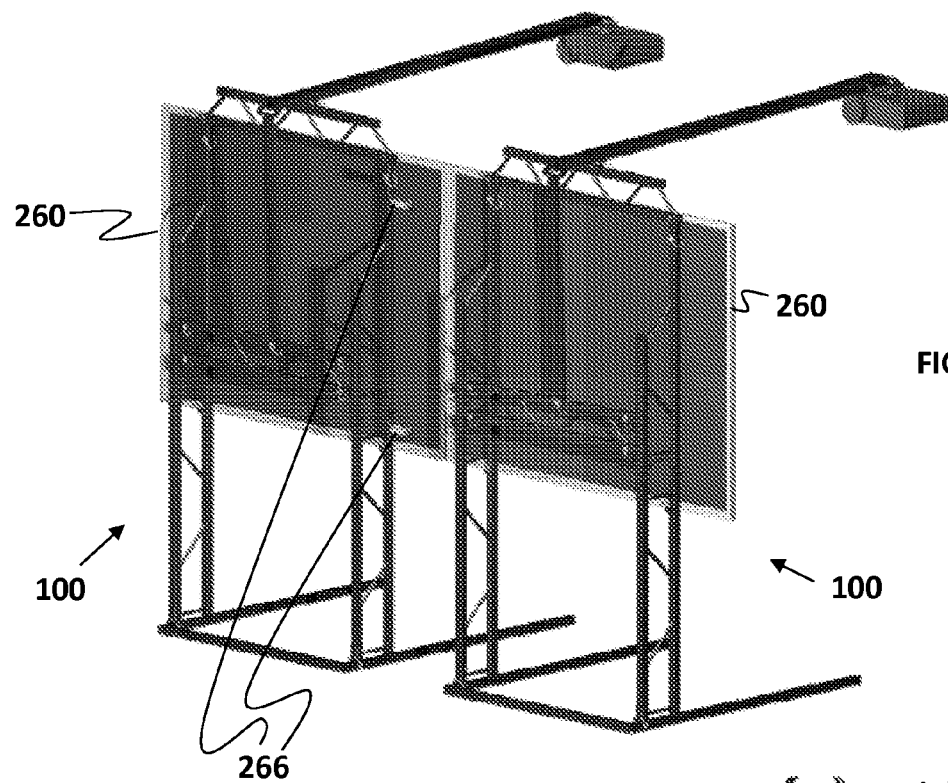
FIGS. 10A and 10B illustrate a mechanism for connecting adjacent display systems together to provide a larger display system, generally as viewed from the rear.
Figure 10B:
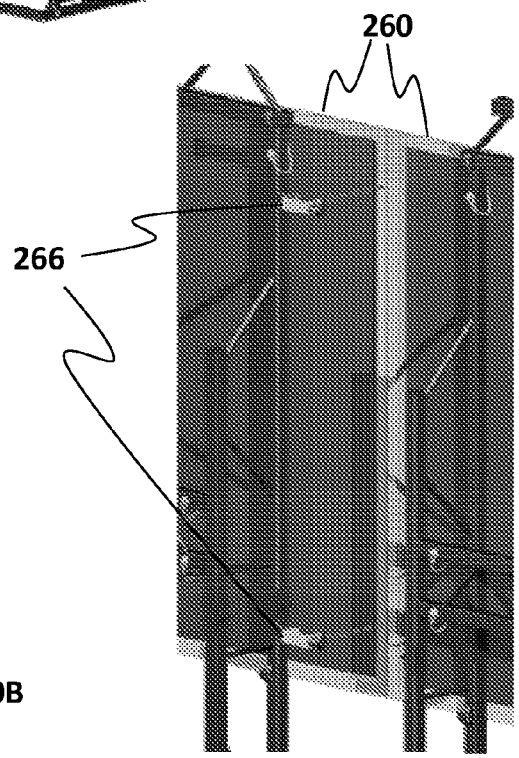

FIGS. 10A and 10B illustrate a mechanism for connecting adjacent display systems together to provide a larger display system. Referring to FIGS. 10A and 10B, two or more display systems 100 can be connected together to provide a larger display area. As shown, the display systems 100 can be arranged side by side with their screen frames 260 arranged immediately adjacent to each other. A joining clamp, bracket, or other suitable connection device 266 can then be used to attached the adjacent screen frames together. In this embodiment, the joining clamp 266 comprises a bracket with a thumb screw arranged through a hole therein. The clamp 266 is placed over contacting side members of the adjacent screen frames 260, and the thumb screw is tightened to secure the clamp in place. Although two joining clamps are shown in the figures, any desired number of joining clamps or other connection devices could be used. In addition, one large screen (not shown) could be used which has a larger screen frame (not shown) that extends across the multiple display frames 110, rather than separate screens 266 and screen frames 260 for each system 100. This can facilitate better viewing of a single, larger continuous image across the multiple display systems 100.

Figure 11A:
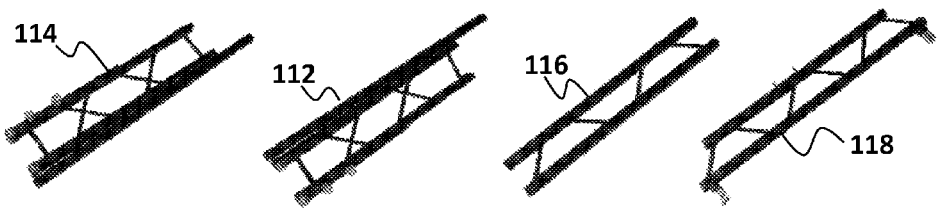
FIG. 11A illustrates a case containing components of a kit, and components thereof, used to assemble a display frame portion of the portable projection and display system of FIG. 1.
Figure 11A:
Figure 11A:
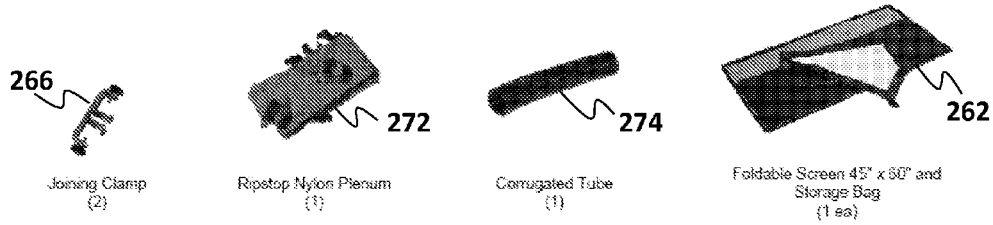
Figure 11A:

The display frame may be provided in the form of a kit. FIG. 11A illustrates a portable kit 290 for constructing a display frame 110. A case 280 can be provided to store and transport the frame components. For instance, the right and left side vertical support members 112, 114, the middle and upper trusses 116, 118, the boom 150 and boom adjustment bar 230, the counterweight bar 240, and the hitch pins 210 can all be included in a portable case 280 as part of the display frame kit 290. The screen frame 260, display screen 262, and thumb screws 212 can also be included. Other optional components shown include the joining clamps 266, a ripstop nylon plenum 272, a corrugated tube 274, a screen bag 264, bungee cable tie downs 276, and a power strip 278.

Figure 11B:
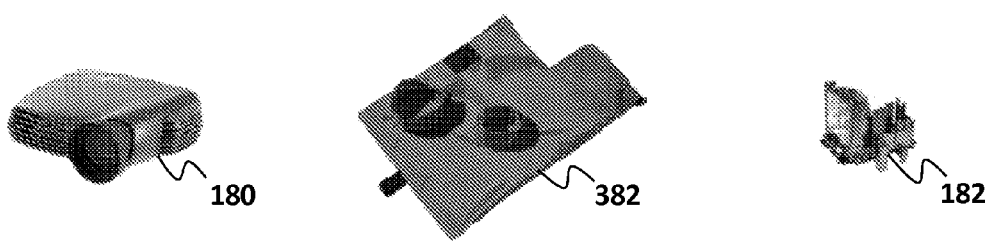
FIG. 11B illustrates a case containing components of a kit, and components thereof, used to assemble a projector portion of the portable projection and display system of FIG. 1.
Figure 11B:
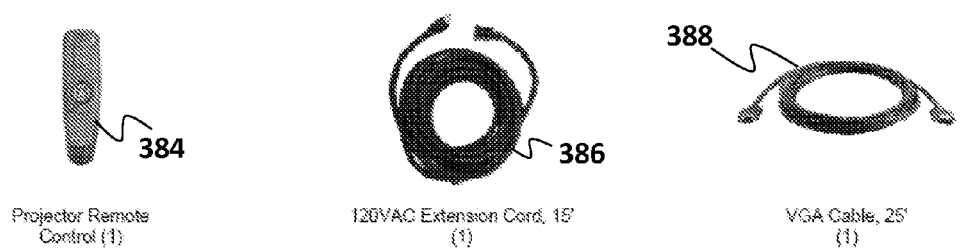
Figure 11B:
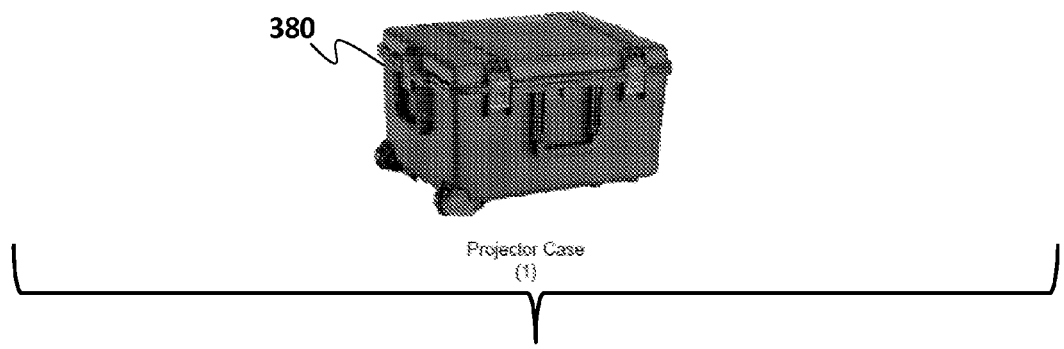

The projector components can be included as part of the same kit or a separate kit and can be included in the same case or a separate case. FIG. 11B illustrates an embodiment where the projection kit 390 is provided separately in its own projector case 380. In this embodiment, the projector kit 390 can include the projector 180 with its mount assembly 312, 314 (see FIG. 9A), a projector cooling bag 382, remote 384, electrical extension cord 386, VGA (or other video cables) 388, and a spare projector lamp 182. The projector kit components can all be arranged in a portable projector case 380 for easy transportation and storage.

Figure 12:
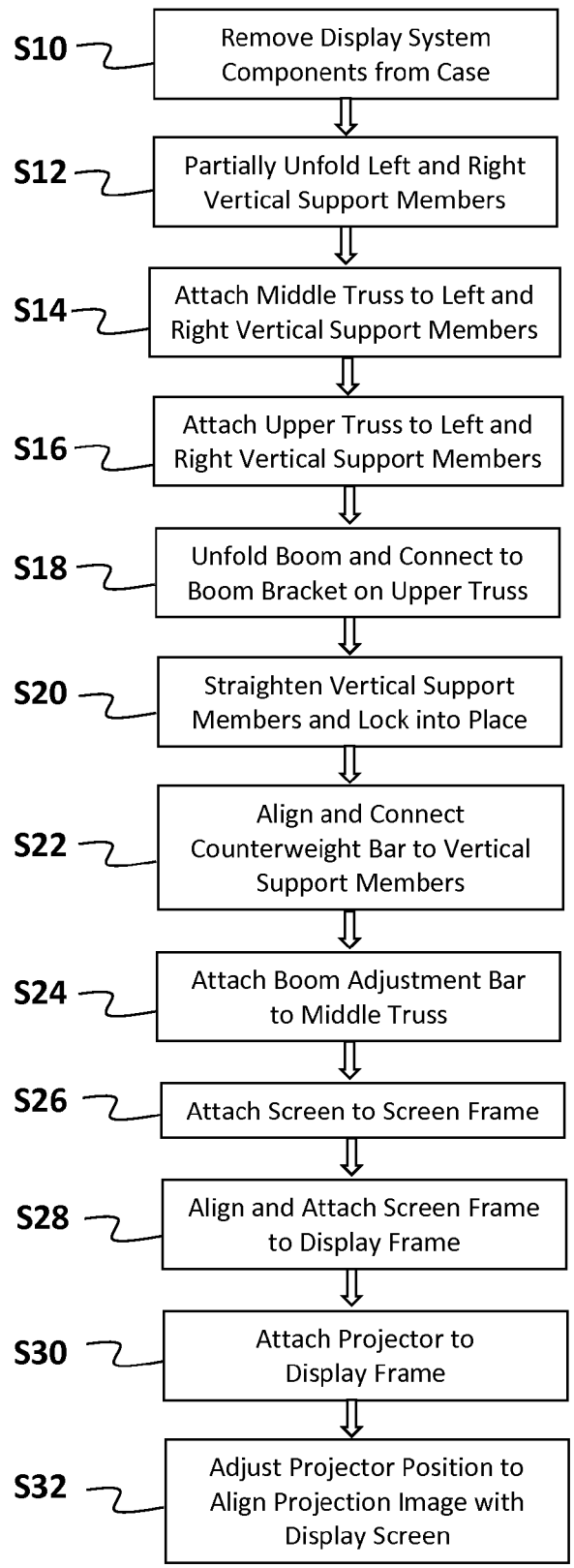
FIG. 12 is a flowchart illustrating a method to assemble the portable projection and display system of FIG. 1 using the components of the kit of FIG. 11.

FIG. 12 is a flow chart illustrating one method for constructing the projection and display system of FIG. 1. A method for constructing a projection and display system 100 will now be described in further detail with additional reference to FIG. 12.

As a first step (S10), the display system components should be removed from the portable case 280 and arranged for easy access during assembly. The left and right vertical support members 112, 114 are then partially unfolded (S12) to permit attachment of the middle truss 116 (S14). The upper truss 118 is also attached to the left and right vertical support members 112, 114 (S16).

With the upper truss 118 attached, the boom 150 is unfolded and connected to the boom bracket 190 on the upper truss (S18). The vertical support members 112, 114 are then fully unfolded and locked into their straightened positions (S20). The counterweight bar 240 is then aligned with and attached to the left and right vertical support members 112, 114 to provide counterweight support to the display frame 110 (S22).

The boom adjustment bar 230 is attached to the middle truss 116 (S24) to complete the display frame setup. The display screen 262 is then unfolded or unrolled and attached to the display screen frame 260 (S26) and the display screen frame 260 is then aligned with and attached to the display frame 110 (S28). The projector 180 is attached to the mounting assembly 310 on the boom 150 (S30). The boom 150, boom adjustment bar 230, and projector alignment within the mounting assembly 310 can then each be adjusted to properly align the projection image with the display screen 262.

A projection and display frame system for use with a projector and a display screen can include a means for supporting the display screen in a vertical position; a boom connected to a top portion of the means for supporting a display screen; a means for mounting the projector to an end of the boom so that the projector can project images onto the display screen; a means for adjusting a length of the boom; a means for adjusting a height of the end of the boom and to thereby adjust a height of the projector; and a means for counterweighing a weight of the projector mounted at the end of the boom.

The means for supporting the display screen in a vertical position can, for instance, include a display frame configured to support the display screen a predetermined height above a support surface. The means for mounting the projector to an end of the boom can include a ram assembly or other desired mounting assembly which preferable provides adjustability of the orientation of the projector with respect to the boom. The means for adjusting a length of the boom can comprise a tube in tube boom assembly or any other slidable attachment mechanism, such as a rail system, that permits adjustment of the position of one section with respect to another section of the boom. The means for adjusting the height of the end of the boom can include, for instance, a boom adjustment bar connected between an opposite end of the boom and the display frame wherein a length of the boom adjustment bar can be adjusted to thereby adjust a vertical position of an end of the boom opposite the projector mount. And the means for counterweighing a weight of the projector mounted at the end of the boom can, for instance, comprise a counterweight bar attached along a rearward, bottom portion of the display frame.

Having described and illustrated principles of the example embodiments of present invention, it should be apparent that the invention can be modified in arrangement and detail without departing from such principles.

The invention claimed is:

1. A projection and display system comprising:
   a frame configured to support a display screen when the frame is assembled, wherein said frame comprises one or more foldable support members;
   an adjustable boom configured to be hingedly connected to a top portion of the frame, wherein a length of the boom is adjustable;
   a projector mount arranged on a first end portion of the adjustable boom, such that, when assembled, a distance between the projector mount and the display screen is adjustable by adjusting the length of the boom; and
   a boom height adjustment member connected between a second end portion of the adjustable boom and a portion of the frame, wherein the second end portion is located opposite the first end portion, and wherein adjustment of a length of the boom height adjustment member adjusts a height of the projector mount with respect to the assembled frame.

2. A projection and display system according to claim 1, wherein the boom height adjustment member comprises multiple longitudinally extending bar sections sharing a common longitudinal axis, wherein a middle bar section is connected between two opposing bar sections through threaded connections, such that rotation of the middle bar section about the longitudinal axis adjusts the length of the boom height adjustment member.

3. A projection and display system according to claim 1, wherein the boom height adjustment member comprises a longitudinally extending boom bar hingedly connected at a first end to an end portion of the adjustable boom opposite the projector mount, said boom bar having a longitudinal axis that extends from the connection to the adjustable boom to the connection to the frame.

4. A projection and display system according to claim 3, wherein the boom bar comprises a multi-piece assembly having at least three serially-connected bar sections extending longitudinally along the longitudinal axis.

5. A projection and display system according to claim 4, wherein the multi-piece assembly comprises a middle section threadingly connected to two end sections, and wherein a length of the boom bar is adjustable by rotation of the middle section about the longitudinal axis.

6. A projection and display system according to claim 1, wherein the adjustable boom comprises a tube-in-tube assembly such that a length of the boom is adjustable by sliding an inner tube within an outer tube.

7. A projection and display system according to claim 6, wherein a length of the boom can be secured in a desired length by tightening a screw inserted through the outer tube and contacting the inner tube.

8. A projection and display system according to claim 1, wherein display screens of different sizes can be attached to the frame.

9. A projection and display system according to claim 1, wherein the display screen comprises a screen frame configured to be removably connected to a display material.

10. A projection and display system according to claim 1, wherein the frame comprises foldable left and right vertical support members, and wherein each of the left and right vertical support members comprises two or more sections hingedly connected together to permit folding, and wherein each section comprises a two-dimensional truss configuration.

11. A projection and display system according to claim 1, further comprising a counterbalance bar configured to be arranged along a rearward bottom portion of the frame when assembled to provide counterbalance for a projector mounted to the projector mount.

12. A projection and display system according to claim 11, wherein the counterbalance bar comprises a weighted bar configured to be arranged parallel to the display screen.

13. A portable display system comprising:
   a frame comprising a plurality of support members, including at least two vertical support members, said vertical support members each comprising two or more sections connected together via a hinged connection to permit folding each of the vertical support members, wherein each section of the vertical support members comprises a two-dimensional truss configuration; and
   a display screen arranged in a display screen frame, wherein the display screen frame is configured to be connected to the frame during use of the display system.

14. A portable display system according to claim 13, further comprising an adjustable boom configured to be hingedly mounted to a top support member near a first end of the boom, said adjustable boom further comprising a projector mount arranged near a second end of the boom arranged opposite the first end of the boom.

15. A portable display system according to claim 14, further comprising an adjustable boom bar connected to the first end of the boom and a portion of the frame, said adjustable boom bar extending in a substantially straight line between its connections to the boom and the frame, wherein a length of the adjustable boom bar is adjustable to raise or lower the projector mount with respect to the frame when assembled via a lever action.

16. A portable display system according to claim 14, wherein the projector mount comprises a ball-and-socket assembly that permits orientation of an attached projector in a desired relationship with respect to the display screen.

17. A projection and display system comprising:
   a frame having vertical support members and one or more horizontal support members, said one or more horizontal support members comprising a top support member;
   a display screen removably attachable to the frame; and
   a boom assembly comprising a boom hingedly connected to the top support member, said boom comprising a projector mount arranged proximal to one end of the boom, wherein the boom assembly is adjustable to change a vertical position of the projector mount by adjusting a longitudinal length of an adjustable boom bar connected between the frame and an end of the boom located opposite the projector mount.

18. A projection and display system according to claim 17, wherein the boom bar comprises a multi-piece assembly at least having two end sections and a middle section connected between the two end sections arranged longitudinally along an axis, and wherein the longitudinal length of the boom bar is adjustable to change a vertical position of the projector mount via a lever action.

19. A projection and display system according to claim 18, wherein each of the vertical support members comprises a two-dimensional truss configuration and is foldable to permit easier transportation and storage.

20. A projection and display system according to claim 19, wherein each of the two-dimensional truss configurations comprises a truss structure arranged along a single plane.

21. A kit to make a projection and display frame, the kit comprising:
   a pair of foldable vertical support members that can be unfolded to form vertical support members;
   a top horizontal support member configured to join to each of the pair of vertical support members near tops of the vertical support members;
   a lower horizontal support member configured to join to each of the pair of vertical support members below the top horizontal support member;
   an adjustable boom configured to pivotally connect to the top horizontal support member, the adjustable boom having an adjustable length, the adjustable boom having a front end having a projector mount configured to connect to a projector, the adjustable boom have a rear end opposite the front end; and
   a longitudinally-extending boom adjustment member having a top end and an opposite bottom end, the top end configured to connect to the rear end of the adjustable boom, the bottom end configured to attach to one or more of the lower horizontal support member and the vertical support members, the boom adjustment member having an adjustable longitudinal length, thereby providing adjustability in a height of a projector connected to the front end of the adjustable boom when assembled.

22. A kit according to claim 21, further comprising a portable case to hold components of the kit.

23. A kit according to claim 22, further comprising the projector.

24. A kit according to claim 23, wherein the projector fits within the portable case holding the other components of the kit.

25. A kit according to claim 22, wherein the projector fits within a portable case separate from the portable case holding the other components of the kit.

26. A method for assembling a field-deployable projection and display system, the method comprising:
   unfolding a pair of folded vertical support members;
   joining a top horizontal support member to each of the pair of vertical support members near tops of the vertical support members;
   joining a lower horizontal support member to each of the pair of vertical support members below the top horizontal support member;
   connecting an adjustable boom to the top horizontal support member in such a way that the adjustable boom pivots with respect to the top horizontal member, the adjustable boom having opposite front and rear ends, the front end extending in front of the support members;
   connecting a longitudinally-extending boom adjustment member having opposite top and bottom ends by connecting the top end of the longitudinally-extending boom adjustment member to the rear end of the adjustable boom and by connecting the bottom end of the longitudinally-extending boom adjustment member to one or more of the lower horizontal support member and the vertical support members;
   adjusting a length of the adjustable boom;
   mounting a projector to a front end of the adjustable boom;
   adjusting a longitudinal length of the boom adjustment member to cause the projector to be at desired height; and
   mounting a screen on a front side of the support members and in view of a projector to thereby display images generated by the projector.

27. A method according to claim 26, wherein the support members each have a two-dimensional truss structure.

28. A projection and display frame system for use with a projector and a display screen, the projection and display frame system comprising:
   a means for supporting the display screen in a vertical position;
   a means for suspending a projector in front of and directed toward the display screen, the means for suspending the projector being connected to the means for supporting the display screen in a vertical position;
   a means for adjusting a distance between the projector and the display screen; and
   a means for adjusting a height of the projector.

* * * * *